United States Patent [19]

Irie

[11] Patent Number: 5,445,881
[45] Date of Patent: Aug. 29, 1995

[54] HIGH RECORDING DENSITY MAGNETIC TAPE AND PROCESS FOR THE PRODUCTION THEREOF

[75] Inventor: Shinichi Irie, Sagamihara, Japan

[73] Assignee: Minnesota Mining and Manufacturing Company, St. Paul, Minn.

[21] Appl. No.: 263,478

[22] Filed: Jun. 22, 1994

[30] Foreign Application Priority Data

Sep. 10, 1993 [JP] Japan .................................. 5-225742

[51] Int. Cl.$^6$ .............................................. G11B 5/00
[52] U.S. Cl. ..................... 428/328; 428/694 BP; 428/694 BF; 428/694 BR; 428/900; 427/130
[58] Field of Search .......... 428/328, 694 BP, 694 BF, 428/694 BR, 900; 427/130

[56] References Cited

U.S. PATENT DOCUMENTS

| | | | |
|---|---|---|---|
| 5,009,929 | 4/1991 | Iida et al. | 427/130 |
| 5,126,215 | 6/1992 | Aonuma e tal. | 428/694 |
| 5,238,753 | 8/1993 | Ryoke et al. | 428/694 BY |

FOREIGN PATENT DOCUMENTS

| | | | |
|---|---|---|---|
| 58-130435A | 8/1983 | Japan . | |
| 3224123A | 10/1991 | Japan . | |
| 5054367A | 3/1993 | Japan . | |

*Primary Examiner*—Stevan A. Resan
*Attorney, Agent, or Firm*—Gary L. Griswold; Walter N. Kirn; Susan Moeller Zerull

[57] ABSTRACT

A high recording density magnetic tape with a magnetic layer comprising magnetic particles, binder, curing agent and high molecular weight fatty acid, provided on a non-magnetic substrate, characterized in that the Ra value (center line average height) of the surface of the magnetic layer is 10 nm or less, and that the Z value defined by the following equation is 3.2 or more:

$$Z = C1/(C2 + C3),$$

wherein
 $C1$ is the spectral integral intensity, measured by X-ray photoelectronic spectral analysis (ESCA), of a carbon atom, which is single-bonded between carbon-carbon atoms,
 $C2$ is the spectral integral intensity, measured by ESCA, of a carbon atom, which is single-bonded to a carbon atom and an atom with an electric negativity degree higher than that of a carbon atom, and
 $C3$ is the spectral integral intensity, measured by ESCA, of a carbon atom, which is double-bonded between carbon-oxygen atoms.

15 Claims, No Drawings

HIGH RECORDING DENSITY MAGNETIC TAPE AND PROCESS FOR THE PRODUCTION THEREOF

FIELD OF THE INVENTION

The present invention relates to a high density magnetic recording tape with a small error rate and excellent trafficability properties. The invention also relates to a process for production of that tape.

BACKGROUND OF THE ART

Previously, in producing a high density magnetic recording tape, the magnetic layer was subjected to a calendering treatment, so as to lessen the Ra value as far as possible; (Ra value is the average surface roughness of centerline measured according to JIS 8060.) Preferably the Ra value is about 15 nm or less improves the electromagnetic conversion characteristics (Japanese Unexamined Patent Publication (Kokai) No. 5-54367). However, when the value of Ra is lessened, the coefficient of friction of the magnetic layer increases, and the trafficability of the magnetic tape is noticeably impaired. "Trafficability" means that coefficient of kinetic friction is small at the first pass of low speed running of a tape (10 to 1,000 cm/min.) and that adhesion of the tape at the start of running the tape is prevented.

To avoid the increase in friction, high molecular weight fatty acids or fatty acid esters have generally been used as lubricants. However, when fatty acids and fatty acid esters are added in small amounts, the trafficability of the magnetic tape remains poor. When these substances are added in large amounts, the strength of the magnetic layer decreases substantially, potentially lowering the durability of the magnetic tape (Japanese Unexamined Patent Publication (Kokai) No. 58-130435). While a high molecular weight fatty acid is especially effective for lessening the coefficient of kinetic friction of a magnetic tape when the tape is running at a low speed, if it is used in a large amounts, it disturbs the mutual adsorption between the ferromagnetic powder and the binder, and the strength of the magnetic layer as a coating is lowered.

Japanese Unexamined Patent Publication (Kokai) No. 3-224123 discloses a process for the production of a magnetic tape, comprising subjecting a magnetic layer to a calendering treatment, so as to harden the magnetic layer, and thereafter subjecting the magnetic layer to contact slide action by use of a plate-like or rod-like hard metal such as carbon steel or super steel, for the purpose of reducing the abrasion characteristics and drop-out, and improving the durability of static images.

However, this process has the following problems: (1) in order to form an effective lubricant film (especially a film of a fatty acid) on the surface of a magnetic layer, contact sliding procedures must be repeated several times; (2) when the contact sliding is effected by use of a metal having an Ra value higher than the roughness of the magnetic layer surface, flaws are produced such as scratches, and many errors are caused; (3) with a contact slide action in only one direction, the lubricant film of the magnetic layer becomes non-uniform or causes anisotropy, so that the coefficient of kinetic friction varies depending on the running direction (the direction in which the contact slide action was effected, and the direction contrary thereto); and (4) when put into practical use, the magnetic tape is brought into frictional contact, in the forward and reverse directions, with the magnetic head, rotary cylinder, and the like of a recording reproduction device, so that it becomes difficult to realize stable running of a tape in any of the directions.

SUMMARY OF THE INVENTION

Accordingly, in order to settle the aforesaid problem, the present invention provides a high recording density magnetic tape with a magnetic layer comprising a magnetic particles, binder, curing agent, and a high molecular weight fatty acid, provided on a non-magnetic substrate, characterized in that the Ra value (center line average roughness) of the surface of the magnetic layer is 10 nm or less, and its Z value, represented by the following equation, is 3.2 or more $$Z = C1/(C2 + C3) \qquad \text{equation (1)}$$

wherein

C1 is the spectral integral intensity, measured by X-ray photoelectric spectral analysis (ESCA), of carbon atoms which are single-bonded between carbon-carbon, C2 is the spectral integral intensity, measured by ESCA, of a carbon atom and another carbon atom which is single-bonded with an atom having an electronegativity higher than that of a carbon atom, and C3 is the spectral integral intensity, measured by ESCA, of a carbon atom which is double-bonded between carbon-oxygen atoms.

The present invention also provides a process for the production of a high recording density magnetic tape comprising a step of subjecting the surface of the aforesaid magnetic layer to a reciprocating contact slide motion by use of a roll having a surface Ra of 0.04 μm or less. Note, the "reciprocating" means motion of back and forth directions.

DETAILED DESCRIPTION OF THE INVENTION

In the present invention, any magnetic particles can be used. However, the advantages of the present invention are most efficiently exhibited when ferromagnetic metal powder is used. The ferromagnetic metal powder adsorbs a large amount of fatty acids which decrease friction, and therefore the amount of fatty acids which transfers to the surface of the tape decreases resulting high friction. The contact slide treatment of the present invention improves the transfer of fatty acids to the surface of the tape, and therefore is useful especially for the production of recording magnetic tapes containing ferromagnetic metal powder.

Ferromagnetic metal powder is a magnetic powder comprising a ferromagnetic metal, and does not include any ferromagnetic powder composed essentially of a metal oxide (e.g. ferromagnetic iron oxide). Examples of such ferromagnetic metal powder include ferromagnetic alloy powders such as Fe—Co, Fe—Co—Ni, and Fe—Co—Ni—P powders, magnetic iron powder composed essentially of α-Fe, and the like. Commercially available product such as "11 M-19" (produced by Dowa Kogyo), "KD1000B", and "KDK13OOHB" (both produced by Kanto Denka) may be used.

As a binder, the following known thermoplastic resins can be used: thermocuring resins; reaction type resins; electron beam curable resins; ultraviolet curable resins; and visible light curable resins, each singly or in combination. In addition, the following may be used: the above resins containing acid groups of carboxyl groups (COOM), sulfinic acid, sulfenic acid, sulfonic acids ($SO_3M$), phosphoric acids ($OPO(OM)_2$), phosphoric acids ($PO(OM)_2$), sulfuric acids ($OSO_3M$), and ester groups thereof, etc. (M is an alkali metal, alkaline earth metal, hydrocarbon group); amphoteric groups such as amino acid and alkyl betaine type groups, amino group, imino group, amide group, quaternary ammonium group, or functional groups such as hydroxyl group, alkoxyl groups, thiole group, epoxy group, isocyanate group, and silyl group.

Examples of the commercially available products of these resins include "MR-113", "MR-120" (both produced by Nippon Zeon), "EC-130" (produced by Sekisui Kagaku), "TI-7503" (produced by Sanyo Kasei), "UR-8300", "UR-8700", (both produced by Toyo Boseki), "NR-2000" (produced by Mitsubishi Rayon), "JSR-9514" (produced by Nippon Gosei Gomu), and the like.

As the curing agent, compounds having 2 or more isocyanate groups, an epoxy group, or a crosslinking functional groups such as ethyleneimine ring may be used. Examples of the commercially-available curing agents include "Millionate MTL" (produced by Nippon Polyurethane), "Takenate 500" (produced by Takeda Yakuhin), "SBU-0856" (produced by Sumitomo Bayer Urethane), "PAPI-135" (produced by Kasei Upjohn), Epichlon 800" (Dainippon Ink Kagaku Kogyo), "PAZ33" (produced by Nippon Shokubai Kagaku), and the like.

The term, "high molecular weight fatty acids" indicates saturated or unsaturated fatty acids with 12 or more carbon atoms. With regard to the steric configuration, both straight and branched saturated or unsaturated fatty acids may be used. For example, mention should be made of lauric acid, myristic acid, palmitic acid, stearic acid, oleic acid, behenic acid, linoleic acid, isopalmitic acid, isostearic acid, and the like. The preferred amount of high molecular weight fatty acid is 1 to 3 parts by weight per 100 parts of ferromagnetic metal powders.

Z value is an indication of how much high molecular weight fatty acid is present on the surface of the tape. The meanings of $C_1$, $C_2$, and $C_3$ are mentioned above. These values are obtained by dividing the spectrum of $C_{15}$ in the ESCA spectral chart, according to curve fitting method. $C_1$ indicates a spectral integral intensity of carbon atoms which are single-bonded between carbon-carbon atoms. The $C_1$ value is greatly affected by the amount of higher fatty acid existing on a magnetic layer surface. $C_2$ indicates a spectral integral intensity of a carbon atom which is single-bonded with an atom such as oxygen and chlorine atoms, having an electronegativity degree higher than that of a carbon atom. $C_3$ indicates a spectral integral intensity of a carbon atom which is double-bonded between carbon-oxygen atoms. The value, $C_2 + C_3$ is greatly influenced by the amount of existing organic components containing polar functional groups, e.g. binding and curing agents. Therefore, the greater the Z value is, the greater proportion of high molecular weight fatty acid is present on the surface as compared with components such as the binder and curing agent, and therefore the coefficient of kinetic friction decreases.

A Z value of 3.2 or more is preferable, because the coefficient of kinetic friction of a magnetic tape can be decreased. In particular, since the coefficient of kinetic friction of a magnetic tape at the first pass, when running at a low speed ranging from 10 to 1,000 cm/min, can be made lower than that of conventional magnetic tape, sticking of the magnetic tape can be prevented at the start of running.

In addition, a Z value of 3.4 or more is preferable, because such the coefficient of dynamic friction is stably lessened for a long period of time. The amount of lubricant such as high molecular weight fatty acid, which is present in the magnetic layer surface of a magnetic tape, varies in amount as result of being evaporated, being transferred into the back surface of the magnetic tape, and so forth. Accordingly, it is very desirable that the amount of higher fatty acid present in the magnetic layer surface be preliminarily left in reserve above what is necessary.

An Ra value of the cylindrical metal surface of less than 0.04 μm is preferable to prevent scratching of the magnetic layer surface when the two surfaces slides against each other. Preferred materials for the metallic surface of the roll are stainless steel, tungsten carbide, and titanium carbide. An Ra value of the magnetic layer surface greater than 10 nm is especially to be avoided, because scratches are produced, and the error rate of the magnetic recoding becomes high.

The "error rate" herein referred to indicates the proportion of the errors of the data produced in the output (reproduction) data, compared to the input (recorded) data. The lower the error rate, the less likely an error is to occur. For example, when $10^5$ data are recorded in a determined recording length, if 5 errors are generated in the reproduced error, it is indicated that the error rate is $5 \times 10^{-5}$.

In addition, the reason why the contact slide motion is effected in back and forth directions is to insure that the lubricant film of the high molecular weight fatty acid formed on the magnetic layer surface is uniform, and does not display anistropy, i.e., to prevent the characteristics of the lubricant film varying according to the direction in which the magnetic layer surface is subjected to frictional contact. When the lubricant film of the high molecular weight fatty acid displays anistropy, the coefficient of dynamic friction varies according to running direction of the magnetic tape, and the problem is caused that running of the magnetic tape becomes unstable, according to the direction. It is desirable that the difference of the coefficient of dynamic friction between the forward and reverse directions be 0.01 or less.

The contact slide motion may occur in the following manner. A prepared magnetic taped may be slid against a roll, having the desired Ra value and a diameter between 2 mm and 1000 mm, as the tape is wound on a reel. The tape should then be rewound onto another roll to enable another contact slide to occur in the opposite direction. This process may be repeated as desired. Alternatively, the tape may be put into contact with two rolls, one of which is fixed (not rotating) while the other rotates at a speed higher than the running speed of the tape wherein the direction of the rotation of the roll and the direction of the movement of the tape are the same. This alternate procedure allows abrading in both the forward and reverse direction in one pass of the tape. The tension on the tape during both of these procedures is preferably in the range of 50 to 1000 g/cm.

The contact slide of the roll to the surface of the magnetic layer is preferably effected at a wrap angle ranging from 10 to 300 degrees. The wrap angle means an angle formed by the straight line linking the center of the roll and a point on the surface of the roll at which a tape to be treated meets the surface of the roll, and the straight line linking the center of the roll and a point on the surface of the roll at which the treated tape leaves the surface of the roll. If the wrap angle is less than 10°, enough effect of contact slide is not obtained, and it is difficult to control Z value and coefficient of kinetic friction. On the other hand, when the wrap angle is larger than 300°, contact surface of the tape and the surface of the roll becomes large resulting too high tension which makes contact slide operation difficult.

EXAMPLES

The present invention will be explained more concretely, with reference to working examples.

The following magnetic layer composition [I] was kneaded by a stirrer, and then dispersed 20 hours at a room temperature. Before coating, substances [II] were poured into the dispersion, and [I] and [II] were dispersed and mixed, so as to prepare a magnetic paint.

TABLE 1

| Magnetic Layer Composition | |
|---|---|
| I | |
| acicular alloy magnetic powder | 100 parts by wt |
| binder resins | 19 parts by wt |
| polyurethane tape resins | 9.5 parts by wt |
| vinyl chloride type resins | 9.5 parts by wt |
| dispersant | |
| phosphoric acid ester type dispersant | 2 parts by wt |
| myristic acid | 0.8 part by wt |
| stearic acid | 0.2 part by wt |
| alumina | 8 parts by wt |
| methyl ethyl ketone | 137.6 parts by wt |
| toluene | 45.9 parts by wt |
| cyclohexanone | 45.9 parts by wt |
| II | |
| lubricants | |
| myristic acid | 1.44 part by wt |
| stearic acid | 0.36 part by wt |
| butyl myristate | 2 parts by wt |
| polyisocyanate | 6 parts by wt |
| methyl ethyl ketone | 10.7 parts by wt |
| toluene | 3.6 parts by wt |
| cyclohexanone | 3.6 parts by wt |

The components of the following back layer composition [III] were kneaded by a stirrer, and thereafter dispersed for 20 hours at a room temperature. Before coating, the substances [IV] were poured, whereafter these components and substances were mixed and dispersed.

TABLE 2

| Composition for Back Layer | |
|---|---|
| III | |
| carbon black | 100 parts by wt |
| carbon black with average primary particle diameter of 340 nm | 1 part by wt |
| carbon black with an average primary particle diameter of 25 nm | 99 parts by wt |
| binder resins | 81.6 parts by wt |
| polyurethane type binder resin | 23.7 parts by wt |
| nitrocellulose type binder resin | 57.9 parts by wt |
| catalyst | 0.18 part by wt |
| methyl ethyl ketone | 618 parts by wt |
| toluene | 309 parts by wt |
| cyclohexanone | 103 parts by wt |
| IV | |
| polyisocyanate | 20 parts by wt |
| methyl ethyl ketone | 472 parts by wt |
| toluene | 157 parts by wt |
| cyclohexanone | 157 parts by wt |

The magnetic coating and coating for back layer were coated on a PET film (thickness: 10.3 μm) to a dried film thickness of 2.6 μm and 0.7 μm, especially, and subjected to a magnetic field orientation by a DC orientator of 3500 gausses and dried, following which it was subjected to a calendering treatment; and the coated film was cured. Subsequently, the film was cut to a width of ½ inch so as to produce a video tape.

The abrasion conditions were set as follows. Using stainless rolls with a diameter of 4 mm, an Ra value of 0.04 μm (Comparative Examples 1 to 3 and Examples 1 to 4), or stainless rolls with a diameter of 4 mm, and an Ra value of 0.06 μm (Comparative Examples 4 and 5), setting the wrap angle at 90°, 180°, the tension was set as 0.05 kg/cm or 0.5 kg/cm. 1 to 3 back and forth motions or 1 or 2 one-way polishings were repeated.

Combinations of the conditions and the obtained results are as follows.

TABLE 3

| | Ra of roll (μm) | Contact · Slide Conditions | | | Determined Value of ESCA | Difference of Coefficients of Kinetic Friction due to Directions | Coefficient of Kinetic Friction for 1 Pass* | Scratch |
|---|---|---|---|---|---|---|---|---|
| | | number of times [number of reciprocations] | tension [kg/cm] | wrap angle [°] | | | | |
| Comp. Ex. 1 | 0.04 | 0 | — | — | 3.0 | 0.00 | 0.46 | Absent $3 \times 10^{-5}$ |
| Comp. Ex. 2 | 0.04 | 1 pass in a single direction only | 0.05 | 90 | 3.0 | 0.07 | 0.43 | Absent $3 \times 10^{-5}$ |
| Comp. Ex. 3 | 0.04 | 2 passes in a single direction only | 0.05 | 90 | 3.0 | 0.06 | 0.41 | Absent $3 \times 10^{-5}$ |
| Ex. 1 | 0.04 | one back and forth motion | 0.05 | 90 | 3.2 | 0.01 | 0.36 | Absent $3 \times 10^{-4}$ |
| Ex. 2 | 0.04 | 3 back and forth motions | 0.05 | 90 | 3.4 | 0.00 | 0.34 | Absent $3 \times 10^{-4}$ |
| Ex. 3 | 0.04 | one back and forth motion | 0.50 | 90 | 3.4 | 0.00 | 0.34 | Absent $5 \times 10^{-5}$ |
| Ex. 4 | 0.04 | one back and forth motion | 0.05 | 180 | 3.3 | 0.01 | 0.35 | Absent $5 \times 10^{-5}$ |
| Comp. Ex. 4 | 0.06 | 1 pass in a single direction only | 0.05 | 90 | 3.0 | 0.07 | 0.34 | Present $3 \times 10^{-5}$ |
| Comp. | 0.06 | one back and | 0.05 | 90 | 3.2 | 0.01 | 0.36 | Present |

TABLE 3-continued

| Ra of roll (μm) | Contact · Slide Conditions | | | Determined Value of ESCA | Difference of Coefficients of Kinetic Friction due to Directions | Coefficient of Kinetic Friction for 1 Pass* | Scratch |
| --- | --- | --- | --- | --- | --- | --- | --- |
| | number of times [number of reciprocations] | tension [kg/cm] | wrap angle [°] | | | | |
| Ex. 5 | forth motion | | | | | | $3 \times 10^{-4}$ |

*When there is a difference depending on the running direction, it indicates a coefficient of kinetic friction of 1 pass in a direction in which a higher value is exhibited.

In Comparative Examples 1 to 3 and Examples 1 to 4, no flaw (scratch in the sliding direction) was observed at all. In addition, with respect to the Ra values of the magnetic surface, there was no change in Comparative Examples 2 and 3 and Examples 1 to 4 (Ra=5 nm), as compared with Comparative Example 1, in which contact sliding was not performed (Ra=5 nm). In the magnetic surface in Comparative Examples 4 and 5, scratches were partially observed in the sliding direction. Ra in the portion of the magnetic tape, where scratches were produced, could not be determined.

The error rate was determined by use of a sample, after it had been subjected to the aforesaid contact slide motion. The measuring method was such that the error rate in the recording length for one minute was determined by use of a digital VTR.

The determined values were within the range between $3 \times 10^{-5}$ and $5 \times 10^{-5}$, for the samples of Examples 1 to 4 and Comparative Examples 1 to 3. In Comparative Examples 4 and 5 where scratches were produced, the determined values were within the range between $1 \times 10^{-4}$ and $3 \times 10^{-4}$, which is larger than the error rates in the working examples by about one figure.

The coefficient of kinetic friction was determined by using a horizontal type friction coefficient analyzer (Yokohama System Kenkyu-sho) at 25° C. and a relative humidity of 60%, tension of 52 g, and slide rate of 180 cm/min.

What is claimed is:

1. A magnetic recording tape with a magnetic layer comprising magnetic particles, binder, curing agent and high molecular weight fatty acid, provided on a nonmagnetic substrate, wherein the Ra value of the surface of the magnetic layer is 10 nm or less, and its Z value represented by the following equation is 3.2 or more:

$$Z = C1/(C2+C3)$$

wherein

C1 is the spectral integral intensity, measured by X-ray photoelectric spectral analysis, of carbon atoms which are single-bonded between carbon-carbon atoms C2 is the spectral integral intensity, measured by ESCA, of a carbon atom which is single-bonded with an atom having an electronegativity higher than that of a carbon atom, and C3 is the spectral integral intensity, measured by ESCA, of a carbon atom which is double-bonded between carbon-oxygen atoms, wherein the surface of the magnetic layer has been abraded by a back and forth contact slide motion against a roll having a surface Ra of 0.04 μm or less.

2. The magnetic recording tape of claim 1, wherein the Z value is 3.4 or more.

3. The magnetic recording tape according to claim 1 further comprising a high molecular weight fatty acid in the magnetic layer in an amount ranging from 1 to 3 parts by weight, based on 100 parts by weight of the magnetic particles.

4. The magnetic recording tape according to claim 1 wherein the difference between the coefficient of kinetic friction of the magnetic tape in the forward and reverse directions is 0.01 or less.

5. The magnetic recording tape of claim 1 wherein the magnetic particles are ferromagnetic metal powder.

6. A process for the production of the magnetic recording tape of claim 1 comprising the steps of:
dispersing magnetic pigment, binder resin, curing agent and lubricant in a solvent,
coating the dispersion on a nonmagnetic substrate, drying the dispersion, and curing the dispersion to form a magnetic layer, and
subjecting the surface of the dried and cured magnetic layer to a back and forth contact slide motion by use of a roll having a surface Ra of 0.04 μm or less.

7. The process of claim 6 wherein the diameter of the roll is within the range between 2 mm and 1,000 mm.

8. The process of claim 6 wherein the roll is composed of a material selected from stainless steel, tungsten carbide, and titanium carbide.

9. The process of claim 6 wherein the contact slide motion is caused by a tension ranging from 50 to 1000 g/cm.

10. The process of claim 6 wherein the contact slide of the roll to the surface of the magnetic layer is effected at a wrap angle ranging from 10 to 300 degrees.

11. The magnetic tape of claim 1 wherein the diameter of the roll is within the range between 2 mm and 1,000 mm.

12. The magnetic tape of claim 1 wherein the roll is composed of a material selected from stainless steel, tungsten carbide, and titanium carbide.

13. The magnetic tape of claim 1 wherein the contact slide motion is caused by a tension ranging from 50 to 1000 g/cm.

14. The magnetic tape of claim 1 wherein the contact slide of the roll to the surface of the magnetic layer is effected at a wrap angle ranging from 10 to 300 degrees.

15. A process for the production of a magnetic recording tape comprising the steps of:
dispersing magnetic pigment, binder resin, curing agent and lubricant in a solvent,
coating the dispersion on a nonmagnetic substrate, drying the dispersion, and curing the dispersion to form a magnetic layer, and
subjecting the surface of the dried and cured magnetic layer to a back and forth contact slide motion by use of a roll having a surface Ra of 0.04 μm or less.

* * * * *

UNITED STATES PATENT AND TRADEMARK OFFICE
CERTIFICATE OF CORRECTION

PATENT NO. : 5,445,881
DATED : Aug. 29, 1995
INVENTOR(S) : Irie

It is certified that error appears in the above-indentified patent and that said Letters Patent is hereby corrected as shown below:

Columns 6-8, Table 3, under column Scratch delete in each subsequent row the number listed their, specifically " $3 \times 10^{-5}$, $3 \times 10^{-5}$, $3 \times 10^{-5}$, $3 \times 10^{-4}$, $3 \times 10^{-4}$, $5 \times 10^{-5}$, $5 \times 10^{-5}$, $3 \times 10^{-5}$, $3 \times 10^{-4}$"

and insert to Table 3, adding a column entitled --Error Rate-- and in order of the rows add the following numbers, one for each row --$5 \times 10^{-5}$--, --$5 \times 10^{-5}$--, --$3 \times 10^{-5}$--, --$3 \times 10^{-5}$--, --$3 \times 10^{-5}$--, --$3 \times 10^{-5}$--, --$3 \times 10^{-5}$--, --$3 \times 10^{-4}$--, --$3 \times 10^{-4}$--.

Signed and Sealed this

Seventh Day of November, 1995

Attest:

BRUCE LEHMAN

Attesting Officer

Commissioner of Patents and Trademarks